United States Patent [19]
Dusart

[11] Patent Number: 5,394,142
[45] Date of Patent: Feb. 28, 1995

[54] SHOCK DETECTOR AND DISTRESS BEACON FOR AN AIRCRAFT INCORPORATING SUCH A DETECTOR

[75] Inventor: Gérard Dusart, Borderes/Echez, France

[73] Assignee: Aerospatiale Societe Nationale Industrielle, Paris Cedex, France

[21] Appl. No.: 113,595

[22] Filed: Aug. 27, 1993

[30] Foreign Application Priority Data

Sep. 8, 1992 [FR] France ................. 92 10702

[51] Int. Cl.⁶ ............................................. B64D 47/06
[52] U.S. Cl. ................... 340/981; 73/517 R; 280/735; 340/436
[58] Field of Search ........... 340/945, 963, 981, 968, 340/429, 467, 436; 324/207.24; 73/517 R; 280/735

[56] References Cited

U.S. PATENT DOCUMENTS

| | | | |
|---|---|---|---|
| 2,959,776 | 11/1960 | Morrah | 340/981 |
| 3,474,680 | 10/1969 | Babson et al. | 73/517 R |
| 3,483,759 | 12/1969 | Venetos et al. | 73/517 R |
| 3,509,942 | 5/1970 | Lindberg | 340/945 |
| 3,879,720 | 4/1975 | Dusheck | |
| 4,267,547 | 5/1981 | Sugiyama | 340/429 |
| 4,270,041 | 5/1981 | Pleyber | |
| 4,311,051 | 1/1982 | Eon et al. | 73/517 R |
| 4,630,289 | 12/1986 | Wren | 340/981 |
| 5,040,118 | 8/1991 | Diller | 340/436 |
| 5,045,835 | 9/1991 | Masegi et al. | 340/436 |
| 5,216,607 | 6/1993 | Diller et al. | 340/436 |

FOREIGN PATENT DOCUMENTS

| | | |
|---|---|---|
| 888765 | 5/1981 | Belgium . |
| 2281609 | 3/1976 | France . |
| 1491907 | 7/1969 | Germany . |
| 2432713 | 1/1976 | Germany . |
| 2124763 | 2/1984 | United Kingdom . |
| 2191863 | 12/1987 | United Kingdom . |

*Primary Examiner*—Brent Swarthout

[57] ABSTRACT

In order that safety systems, such as distress beacon emitters carried on board an aircraft, can be triggered beth in the case of a very short, violent shock or impact and during a longer, but less violent shock or impact, a shock or impact detector is proposed, which takes into account both the amplitude and the duration of a possible shock or impact. This detector comprises an electromagnetic transducer (50), whose coil supplies a pulse signal having an amplitude and duration proportional to the amplitude and to the duration of the shock. An integrator (80) makes it possible to obtain an integrated signal, whose amplitude is proportional both to the amplitude and the duration of the shock. A comparator (82) then makes it possible to control safety systems, if said integrated signal exceeds a preferably regulatable threshold.

17 Claims, 5 Drawing Sheets

SHOCK DETECTOR AND DISTRESS BEACON FOR AN AIRCRAFT INCORPORATING SUCH A DETECTOR

BACKGROUND OF THE INVENTION

The invention relates to a shock or impact detector for carrying on a vehicle, in order to automatically trigger, in the case of a shock or impact, one or more safety systems associated with the vehicle. The invention also relates to an aircraft distress beacon incorporating such a shock or impact detector.

The shock detector according to the invention can be used on all vehicle types, namely land vehicles (cars, buses, trains, etc.), as well as maritime or air vehicles (aircraft, helicopters, etc.).

The nature of the safety system or systems triggered by the shock detector is in particular dependent on the nature of the vehicle carrying it. In the case of land vehicles, they can be systems aiming at protecting from shock or impact persons carried in said vehicle. In the case of maritime and air vehicles, the shock detector usually controls the signal emitter of a distress beacon facilitating the finding and in certain cases identification of the ship or aircraft. When the vehicle is transporting passengers, the shock detector can also control the ignition of emergency light pointers. It can also trigger the putting into operation of an anti-fire safety device.

Although their constructions may differ, the existing shock detectors are all based on the same operating principle. An electric switch, placed in an electric control circuit of the safety system or systems controlled by the detector, is automatically closed by a mobile weight such as a ball, when a shock undergone by the vehicle on which the detector is carried leads to a deceleration of the vehicle exceeding a given threshold. Shock detectors operating according to this principle are more particularly illustrated by U.S. Pat. Nos. 4,873,401 and 4,948,929.

The operating principle of these existing detectors is such that the duration of the shock undergone by the vehicle has no influence on the triggering of the safety systems. However, experience has shown that the consequences of a shock of a relatively small amplitude, but of prolonged duration can be as serious for the vehicle and the persons carried as those induced by a brief, high amplitude shock. Thus, in exemplified manner, the dropping of an aircraft with a very limited incidence onto a wooded area can lead to a prolonged, but limited amplitude shock, which is inadequate to be detected by existing shock detectors, whereas it would justify the triggering of the aircraft safety systems and in particular the emitter of a distress beacon enabling the emergency services to locate and possibly identify in a rapid manner the aircraft.

SUMMARY OF THE INVENTION

The invention specifically relates to an original design shock detector making it possible to ensure the triggering of one or more safety systems of a vehicle, whilst taking account both of the amplitude and the duration of a shock possibly suffered by the latter, so as to be able to ensure said triggering both in the case of a high amplitude, brief shock and in the case of a lower amplitude, prolonged shock.

According to the invention, this object is achieved by means of a shock detector which can be carried on a vehicle for automatically triggering, in the case of a shock or impact, at least one safety system, said detector comprising a shock transducer able to emit, in the case of a shock, a pulse signal having an amplitude and a duration respectively proportional to the amplitude and duration of the shock, integration means, sensitive to said pulse signal, for supplying an integrated signal having an amplitude which increases with the amplitude and duration of the shock and detection and control means sensitive to said integrated signal for triggering the safety system when the amplitude of said integrated signal exceeds a predetermined threshold.

In order to ensure that several brief, low amplitude shocks in cumulative manner cannot trigger the vehicle safety system or systems, the detector advantageously also incorporates means for the automatic zeroing of the detection and control means after the reception by said latter means of an integrated signal.

To permit the adaptation of the detector to different applications, the detection and control means preferably have means for regulating the predetermined threshold.

In a preferred embodiment of the invention, amplification means and shaping means of the pulse signal are interposed between the shock transducer and the integration means. The pulse signal shaping means can in particular comprise a non-linear amplifier and inverted clipping diodes having calibrated thresholds.

The shock transducer or sensor is preferably constituted by an electro-magnetic transducer or sensor, which has a magnetic core able to slide in a tubular body, in opposition to a calibrated spring, when subject to a shock, as well as a detecting coil positioned coaxially around the case or box.

An intermediate, amagnetic material pellet is then preferably placed between the magnetic core and the spring, so as to ensure that the latter is not magnetized by the magnetic core and remains in the compressed position after the detector has been subject to a shock.

Moreover, the ends of the tubular body are sealed and it has a calibrated orifice issuing at its end adjacent to the calibrated spring and as a result of which a damping effect is obtained in the case of a very high amplitude shock, which makes it possible to improve the shock resistance of the transducer. In addition, a set-screw makes it possible to apply the magnetic core to the calibrated spring.

In order that the shock detector can be in a permanent watch state when operating, it advantageously comprises an autonomous energy source having one or more rechargeable batteries, which can be connected to an electric supply circuit of the vehicle responsible for the charging thereof.

The invention also relates to an aircraft distress beacon comprising both a shock detector according to the invention and emitter means controlled by said shock detector. In this case, the shock detector advantageously forms an interchangeable part of the beacon and the emitter means preferably incorporate a second autonomous energy source.

In order that the emitter of the beacon can also be put into service in the case where the airframe shatters outside the shock conditions to which the detector is sensitive, the distress beacon can also have a circuit for controlling the emitter means, which is independent of the shock detector, able to control an automatic putting into operation of the emitter means during a breaking of a cable of said control circuit forming a loop passing in the aircraft.

Moreover, the distress beacon can advantageously comprise a remote control, which can be placed on the aircraft instrument panel.

BRIEF DESCRIPTION OF THE DRAWINGS

The invention is described in greater detail hereinafter relative to a non-limitative embodiment and with reference to the attached drawings, wherein show.

DETAILED DESCRIPTION OF THE INVENTION

The embodiment which will now be described with reference to FIGS. 1 to 8 relates to an aircraft distress beacon having a shock detector according to the invention. However, it is pointed out that this application is in no way limitative and that the shock detector according to the invention can also be used, in association with one or more safety systems, on land, air or maritime vehicles of all types, in order to automatically trigger said safety systems when a shock has been detected.

Figure 1:
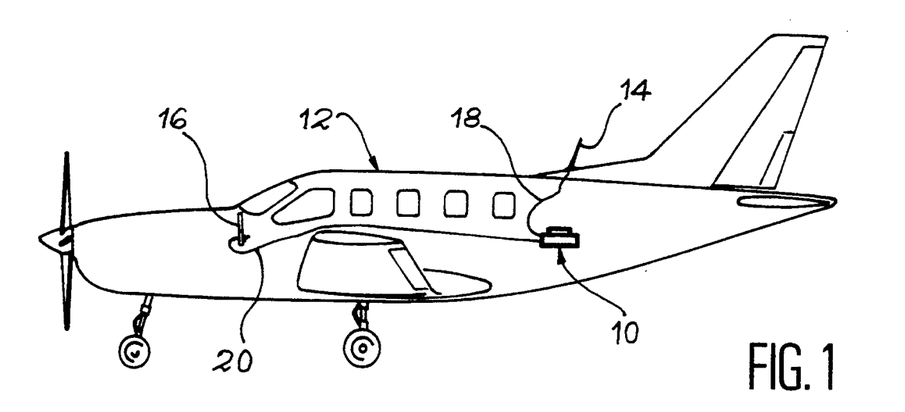
FIG. 1 A side view very diagrammatically illustrating the installation of a distress beacon having a shock detector according to the invention within an aircraft.

As is very diagrammatically illustrated in FIG. 1, the distress beacon box or case 10 is installed within the aircraft 12 at an accessible location, preferably located to the rear of the aircraft. This location can in particular be the radio equipment bay and has an inspection door giving access to the box. The box 10 is fixed on a planar, horizontal surface and in the longitudinal axis of the aircraft. More specifically, on the basis of external reference markings, the box 10 is oriented in such a way that the magnetic core of the shock transducer which it contains can move towards the front if the aircraft strikes an obstacle.

Apart from the box 10, the distress beacon has an external antenna 14 and preferably a remote control 16. The external antenna 14 is mounted on the aircraft fuselage 12, substantially vertically of the box 10, to the front of the rudders, at a location which is as far away as possible from the other radio antennas. The antenna 14 is connected to the box 10 by a connecting cable 18.

In addition, the remote control 16 is installed on the aircraft control panel 12 within reach of the pilot's hands. It is also connected to the box 10 by a cable 20.

Figure 2:
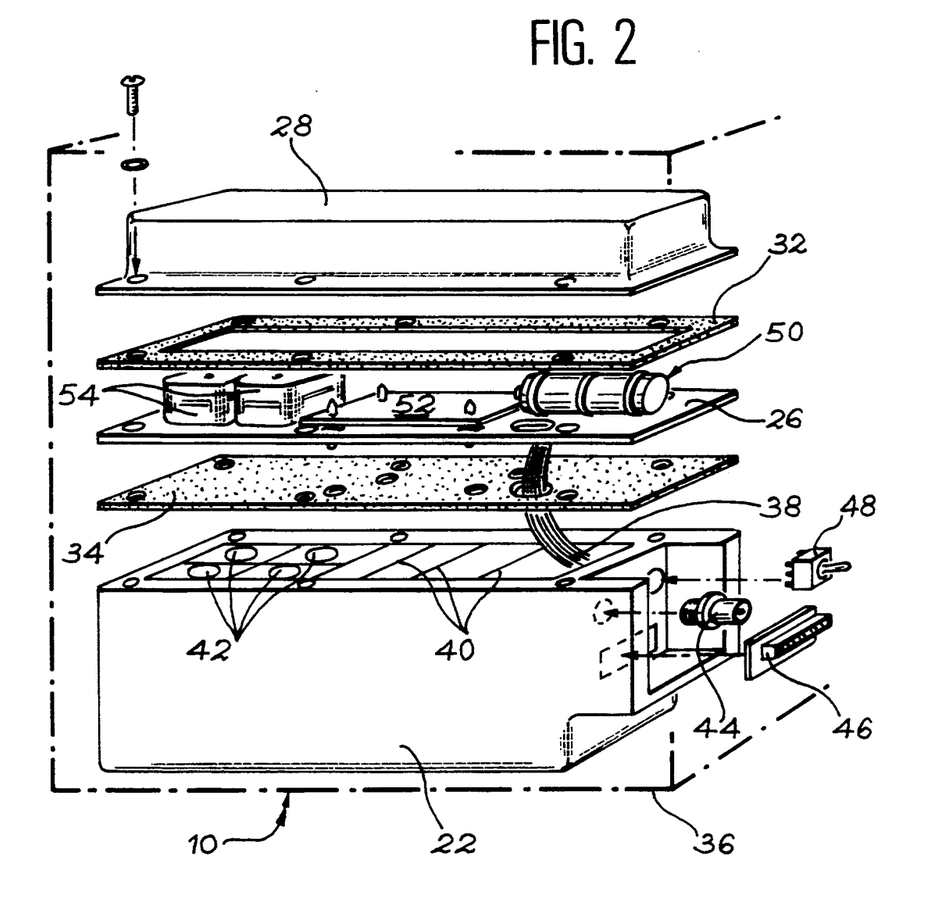
FIG. 2 An exploded perspective view showing in greater detail the beacon equipping the aircraft illustrated in FIG. 1.

The main elements of the box 10 of the distress beacon are diagrammatically illustrated in FIG. 2. It can be seen that the box 10 has a lower portion 22 in which are housed the emitter means, a detachable, intermediate plate 26 carrying the shock detector and an upper closing cover 28. These different parts are fixed to one another by screws 30 and the sealing of the assembly is ensured by joints 32 and 34 respectively interposed between the upper cover 28 and the plate 26 and between the plate 26 and the lower part 22 of the box. As a result of this arrangement, it is obvious that the intermediate plate 26 can be changed, if necessary, by simply removing the screws 30. The box 10 rests on a planar, horizontal surface of the aircraft by means of a not shown flange. The latter can be fixed to the aircraft by screws, whereas the box is fixed to the flange by a fireproof strap (not shown) facilitating a rapid opening. The box 10 is advantageously placed within a fireproof envelope 36 making it possible to increase the fire resistance of the beacon during a fire on board or during an accident.

A brunch of cables 38 connects the shock detector installed on the plate 26 to emitter means located in the lower part 22 of the box. These emitter means can have a random construction, so as to emit signals making it possible for the emergency services to find and preferably identify the aircraft in the case of an accident, when said emitter means have been triggered by the shock detector. For example, they are installed on printed circuits 40 located in the lower part 22 of the box. These printed circuits 40 are interchangeable when the box has been opened.

The emitter means materialized by the printed circuits 40 have an autonomous energy source, e.g. constituted by lithium batteries 42 also located in the lower part 22 of the box.

At one of its ends, the lower part 22 of the box 10 of the distress beacon has a base 44 permitting the connection of the cable 18 ensuring the connection of the antenna 14, as well as a base 46 permitting the connection of the cable 20 by which the remote control 16 is connected to the box.

A switch 48 is also placed on said end of the part 22 to enable the user to pass the beacon from a stop state to a manual or automatic operating state. The manual operating state permits a checking of the satisfactory operation of the beacon emission means or the voluntary triggering of said emission means in the case of force majeure. The automatic operating state brings the beacon into a permanent watch state during a flight and corresponds to the position in which the beacon is normally positioned during flight.

The shock detector installed on the plate 26 is constituted by a shock transducer 50, an electronic circuit 52 and an autonomous energy source e.g. constituted by two rechargeable cadmium-nickel batteries 54.

Figure 3:
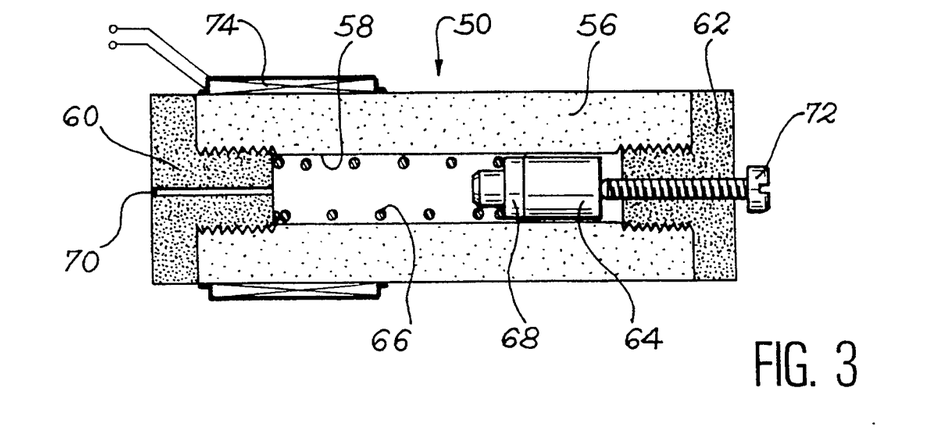
FIG. 3 A longitudinal sectional view of the shock transducer used in the shock detector equipping the beacon of FIG. 2.

As is more particularly illustrated in FIG. 3, the shock transducer 50 is an electromagnetic transducer comprising a tubular body 56 made from an magnetic material having a particularly low friction coefficient, such as polytetrafluoroethylene. The tubular body 56 internally defines a bore 58, whose axis is oriented in accordance with the axis of the aircraft or parallel to said axis when the box 10 is fixed in the aircraft. The front and rear ends of said bore 58 are sealed respectively by front 60 and rear 62 plugs also made from an amagnetic material.

A magnetic core 64 is slidingly placed within the bore 58. This magnetic core 64 is made from a magnetic material having a high stability in time, such as the material marketed under the name "Bremax" by Arelec.

The magnetic core 64 is moved towards the rear plug 62 by a calibrated helical spring 66 also located in the bore 58 and bearing by its opposite end against the front plug 60. The spring 66 is made from a material such as low remanence spring steel. It is calibrated very accurately, as a function of the mass of the core 64, so that the maximum travel of the latter is reached for a clearly defined aircraft deceleration, e.g. approximately 25 Gal.

An intermediate pellet 68 is placed between the magnetic core 64 and the spring 66, so as to ensure that the latter is not magnetized by the core 64 and does not remain blocked in its compressed state following a shock. To this end, the intermediate pellet 68 is made from an amagnetic material such as polytetrafluoroethylene. On its front face turned towards the spring 66, it also has a central projecting portion serving as a guide to the spring 66 during its compression.

When the box 10 carrying the shock transducer 50 is installed in the aircraft, it must be oriented in such a way that the spring 66 is placed at the front of the magnetic core 64, so that a shock causing a sudden aircraft deceleration leads to the compression of the spring by the core.

The front plug 60 on which bears the spring 66 is centrally provided with a calibrated hole 70 by which the portion of the bore 58 containing the spring 66 communicates with the outside. The cross-section of said calibrated hole is designed in such a way that the air stored in the bore 58 does not normally impede the displacement of the magnetic core 64 in opposition to the spring 66, but reduces said displacement when the deceleration reaches a very high value (up to approximately 500 Gal), able to bring about the destruction of the shock transducer under the effect of the displacement of the magnetic core 64.

The rear plug 62 placed on the side of the magnetic core 64 is traversed by a setscrew 72 making it possible to adjust the rest position of the magnetic core, so that it permanently bears against the adjacent end of the spring 66 by means of the pellet 68.

Figure 4:
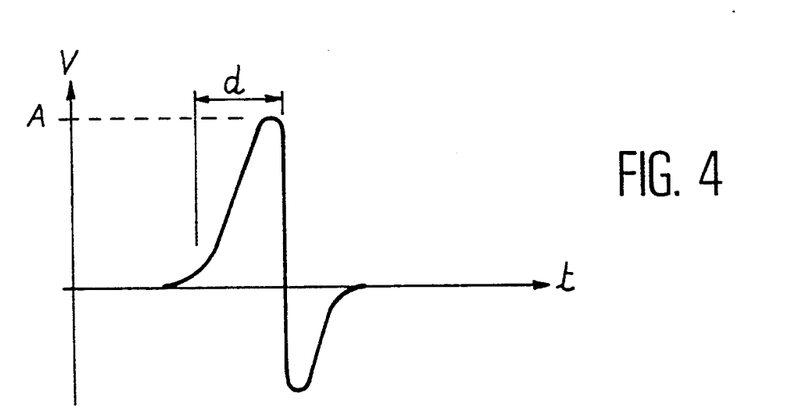
FIG. 4 Diagrammatically the voltage pulse signal (V) supplied by the shock transducer coil of FIG. 3, as a function of time (t), when the aircraft is subject to a shock.

Finally, the shock transducer 50 has a coil 74 placed round the front end of the body 56. When energized by an electric current from the batteries 54, said coil 74 supplies a pulse signal, as illustrated in FIG. 4, if the aircraft is subject to an adequate shock to bring about the forward displacement of the magnetic core 64 in opposition to the calibrated spring 66. More specifically, the amplitude A and duration d of the positive part of said pulse signal are proportional respectively to the amplitude and duration of the shock suffered by the aircraft. Thus, the amplitude A of the signal is proportional to the displacement travel of the magnetic core 64 in opposition to the spring 66, which is itself proportional to the deceleration of the aircraft, whilst the duration d of the signal is proportional to the shock duration.

Before describing in greater detail the different components of the electronic circuit 52 (FIG. 2) receiving the signal supplied by the coil 74, a brief description will be given with reference to FIG. 5 of the main functional stages of said circuit.

Figure 5:
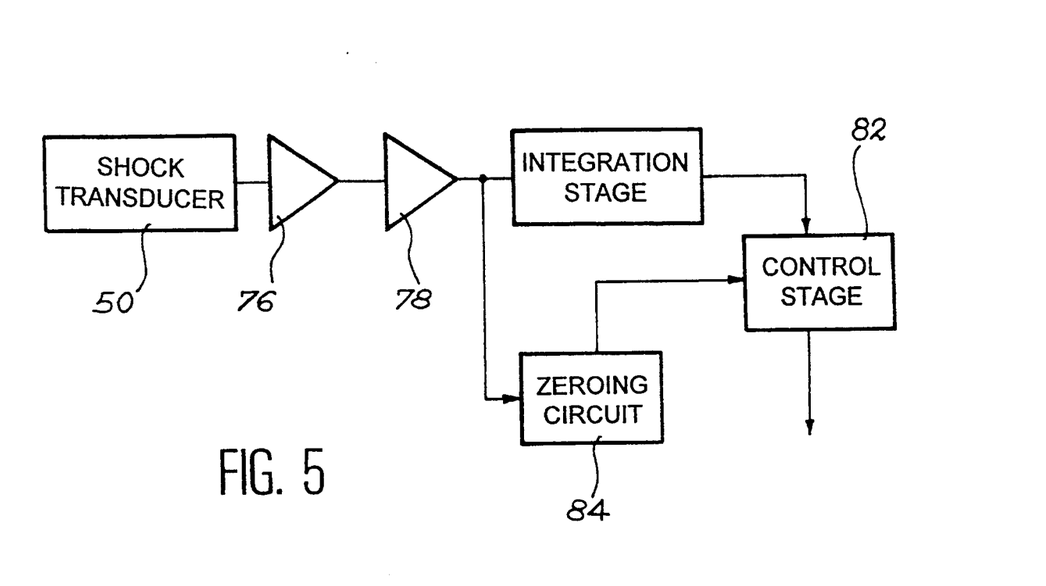
FIG. 5 An operating diagram of the shock detector according to the invention.

Thus, FIG. 5 shows that the pulse signal supplied by the coil of the shock transducer 50 is firstly amplified by a regulatable gain amplifier stage 76. The amplified signal leaving the amplifier stage 76 is then injected into a shaping stage 78, which shapes the signal as a function of its amplitude and duration. The amplified and shaped signal is then integrated in an integration stage 80, which supplies an integrated signal, whose amplitude represents the surface of the amplified, shaped pulse signal. In other words, the amplitude of the integration signal supplied by the integration stage 80 is proportional both to the amplitude and the duration of the shock. This means that the integrated signal can assume comparable values for a low amplitude, long duration shock, for a high amplitude, low duration shock and for an average amplitude and average duration shock.

The integrated signal leaving the integration stage 80 is transmitted to a detection and control stage 82, which has a regulatable threshold comparator circuit, so as to control the emitter means installed on integrated circuits 40, when the integrated signal supplied by the integration means 80 reaches or exceeds the aforementioned regulatable threshold.

The electronic circuit 52 also has a zeroing circuit 84, which receives the amplified, shaped signal from the shaping stage 78, in order to zero the detection and control stage 82 following each pulse signal supplied by the coil of the shock transducer 50. This zeroing makes it possible to ensure that the emitter means 40 are not triggered as a result of an accumulation of small, short duration, successive shocks.

Figure 6:
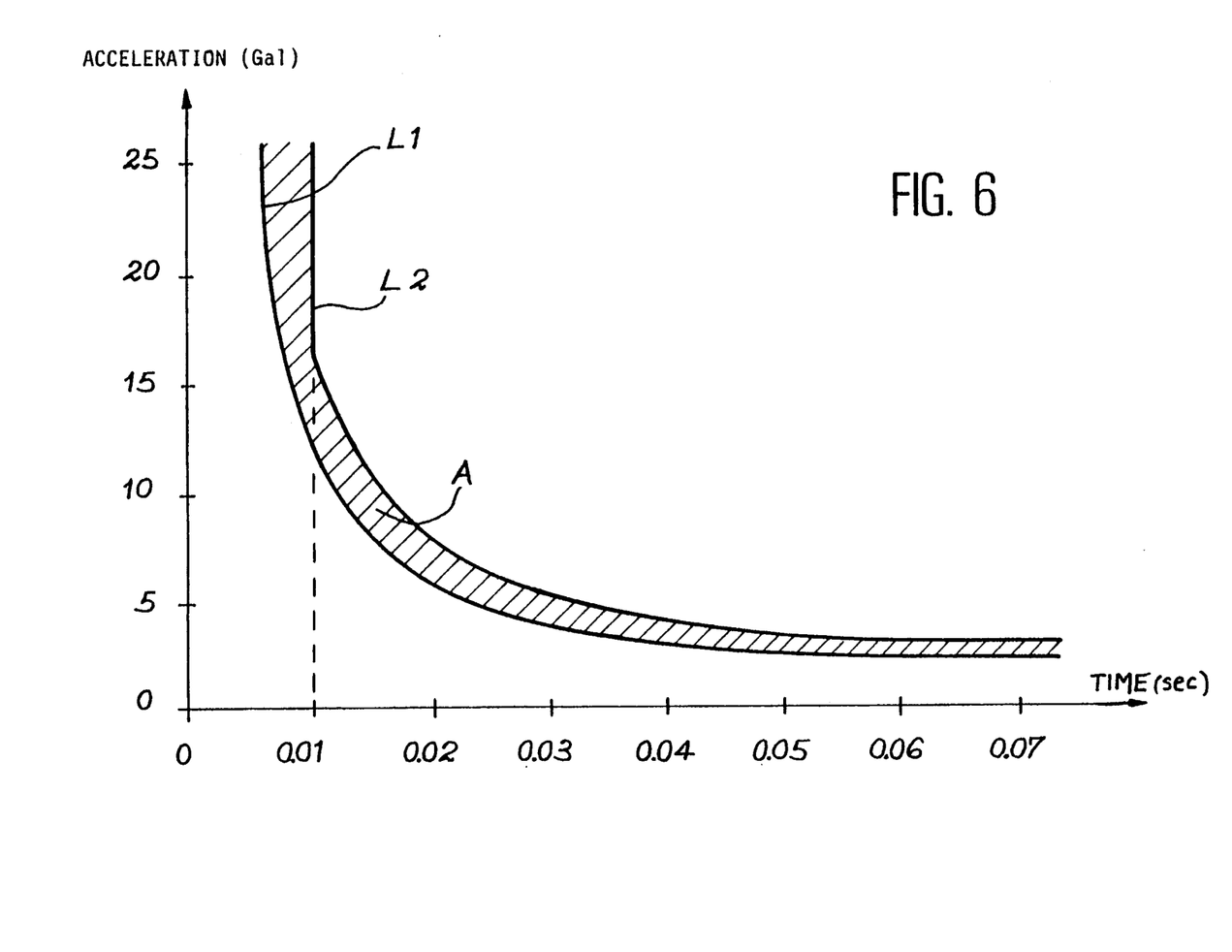
FIG. 6 A curve illustrating the response zone of the shock detector according to the invention, on which the time (in seconds) is plotted on the abscissa and the acceleration (in Gal) is plotted on the ordinate.

As illustrated by FIG. 6, the integration and then shaping of the pulse signal supplied by the coil of the shock transducer 50 make it possible to ensure that the triggering of the emitter means of the beacon occur automatically in a zone A located between a first curve L1 and a second curve L2 on a reference mark, whose abscissas represent the time or duration of the shock in seconds and the ordinates represent the acceleration or deceleration in Gal. More specifically, the curve L1 represents the minimum threshold beyond which triggering can occur and curve L2, substantially parallel to L1, represents the maximum threshold beyond which triggering must have occurred. The automatic triggering of the safety beacons equipping aircraft in the zone A takes into account both the duration and amplitude of the shocks.

Figure 7:
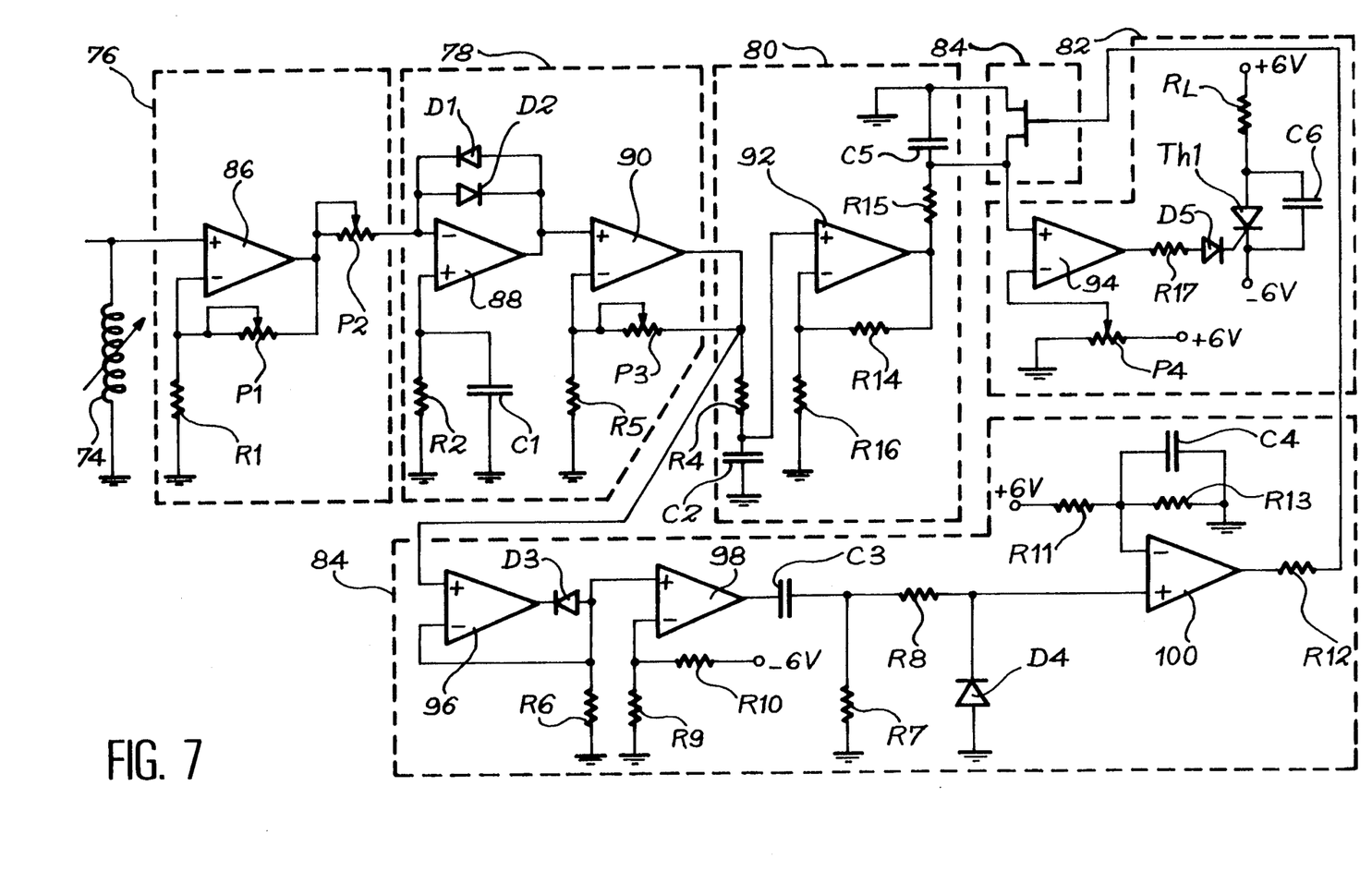
FIG. 7 In greater detail the electronic circuit associated with the shock transducer illustrated in FIG. 3, in the shock detector of FIG. 5.

A more detailed description of the shock detector electronic circuit will now be given with reference to FIG. 7. In the latter it is possible to see the coil 74 of the shock transducer 50 connected between earth and the positive terminal of a linear amplifier 86 constituting the essential component of the amplifier stage 76 in FIG. 5. The negative input of the amplifier 86 is connected to earth by a resistor R1 and to the output of the amplifier by a potentiometer P1 making it possible to regulate its gain.

The output of the linear amplifier 86 is connected to the negative input of a non-linear amplifier 88, which forms part of the amplified signal shaping stage 78, by means of another potentiometer P2. The positive input of the amplifier 88 is connected to earth by a resistor R2 and a capacitor C1 connected in parallel. Two head to tail diodes D1, D2, also connected in parallel, connect the negative input and the output of the non-linear amplifier 88.

The non-linear character of the amplifier 88 permits the shaping of the amplified pulse signal leaving the amplifier 88, so that said signal evolves in accordance with the curves L1 and L2 of FIG. 6. In addition, the diodes D1 and D2 are calibrated diodes with a controlled threshold making it possible to clip to a constant voltage level the signal leaving the amplifier 88.

The shaping stage 88 also comprises a low gain linear amplifier 90, whose positive input is connected to the output of the non-linear amplifier 88. The negative input of said amplifier 90 is connected to earth by a resistor R5 and to the output of the amplifier 90 by a potentiometer P3. Said potentiometer P3 makes it possible to regulate at random the gain of the amplifier 90.

The amplified, shaped signal passing out of the amplifier 90 then enters the integration stage 80. The latter firstly comprises a resistor R4 and a capacitor C2 connected in series between the output of the amplifier 90 and earth. The center between the resistor R4 and the capacitor C2 is connected to the positive input of a linear amplifier 92 making it possible to amplify the thus obtained integrated signal within the integration stage 80. The negative input of the amplifier 92 is connected to earth by a resistor R16 and to the output of said same amplifier by a resistor R14.

The integrated, amplified signal leaving the amplifier 92 is again integrated on traversing successively a resistor R15 and a capacitor C5 connected in series between the output of the amplifier 92 and earth. The center between the resistor R15 and the capacitor C6 is connected to the positive input of a comparator 94 of the detection and control stage 82. A potentiometer P4 connected between earth and a reference voltage of e.g. +6 V coming from the batteries 54 is connected to the negative input of the comparator 94. This potentiometer P4 makes it possible to regulate the voltage threshold beyond which the integrated signal received at the positive input of the comparator must trigger the putting into operation of the beacon emitter means.

To this end, the output of the comparator 94 is connected to the control electrode of a thyristor Th1 across a resistor R17 and a diode D5. The thyristor Th1 is in series with the emission means, whose resistance is designated by $R_L$ in FIG. 7 and the assembly is subject to a supply voltage e.g. determined by the +6 V and −6 V terminals of the batteries 54. A capacitor C6 is located in parallel on the thyristor Th1.

That part of the electronic circuit of the shock detector which has just been described ensures the triggering of the beacon emitter means when the integrated signal entering the comparator 94 exceeds the voltage threshold preregulated with the aid of the potentiometer P4. In view of the fact that the level of said signal is dependent both on the amplitude A and the duration d of the pulse signal (FIG. 4) emitted by the coil 74 in the case of a shock or impact, the triggering of the beacon emitter means occurs both in the case of a high amplitude, short duration shock and in the case of a relatively low amplitude, long duration shock, or an average amplitude and average duration shock. The disadvantages inherent in existing shock detectors, which only take into account the amplitude of the shocks, are consequently avoided.

It should be noted that the gains of the amplifiers 86, 90 and 92 are relatively low, so as to only introduce minimum background noise into the processed signals.

In the electronic circuit which has just been described, the discharge of the capacitor C6 only occurs when the voltage at the positive input of the comparator 94 has the effect of releasing the thyristor Th1. Consequently, in the absence of the zeroing circuit 84, the capacitor C5 could be progressively charged under the effect of successive, very low amplitude and very short duration shocks, which could lead to an untimely triggering of the beacon emitter means as a result of the accumulation of charges in the capacitor C5.

This disadvantage is avoided by the zeroing stage 84, which comprises an amplifier 96 forming a perfect diode, whose positive input is connected to the output of the amplifier 90 and whose negative input is connected to earth across a resistor R6. The negative/input of the amplifier 96 is also connected to the output of said seine amplifier across an inverted diode D3. The assembly formed by the amplifier 96 and the diode D3 makes it possible to only retain the useful part of the shaped, amplified signal leaving the amplifier 90.

The negative input of the amplifier 96 is connected to the positive input of a comparator 98, whose negative input is connected to earth across a resistor R9 and to a fixed negative reference voltage of e.g. 6 V across a resistor R10. If the voltage at the positive input of the comparator 98 is below a negative voltage threshold predetermined by the value of the resistor R10, the comparator 98 supplies at its output a signal, whose voltage is eg. equal to +6 V.

The output signal of the comparator 98 is transmitted to the positive input of a second comparator 100 across a shunt circuit, which comprises in series, between the output of the comparator 98 and the positive input of the comparator 100, a capacitor C3 and a resistor R8. A resistor R7 connects the center between the comparators C3 and R8 to earth and an inverse-connected diode D4 connects the positive input of the comparator 100 to earth. In this shunt circuit, the assembly formed by the resistor R8 and the diode D4 makes it possible to eliminate the negative voltages of the signal.

The comparator 100 eliminates the distortions of the signal from the shunt circuit. To this end, the negative terminal of the comparator 100 is connected to the center between two resistors R11 and R13 connected in series between a fixed voltage source, e.g. +6 V and earth. A capacitor C4 is connected in parallel on the resistor R13, i.e. between the negative input of the comparator 100 and earth.

As a result of the different components of the zeroing stage 84 which have just been described, a voltage signal essentially shaped like a square-wave is emitted with a certain delay at the output of the comparator 100 whenever an amplified, shaped pulse signal passes out of the amplifier 90. This substantially square-wave-shaped voltage signal is injected, across a resistor R11, at the gate of a transistor T1 connected in parallel on the capacitor C5, so as to automatically ensure the discharge of the latter whenever a pulse signal is emitted by the coil 74. This brings about the zeroing of the circuit.

Figure 8:
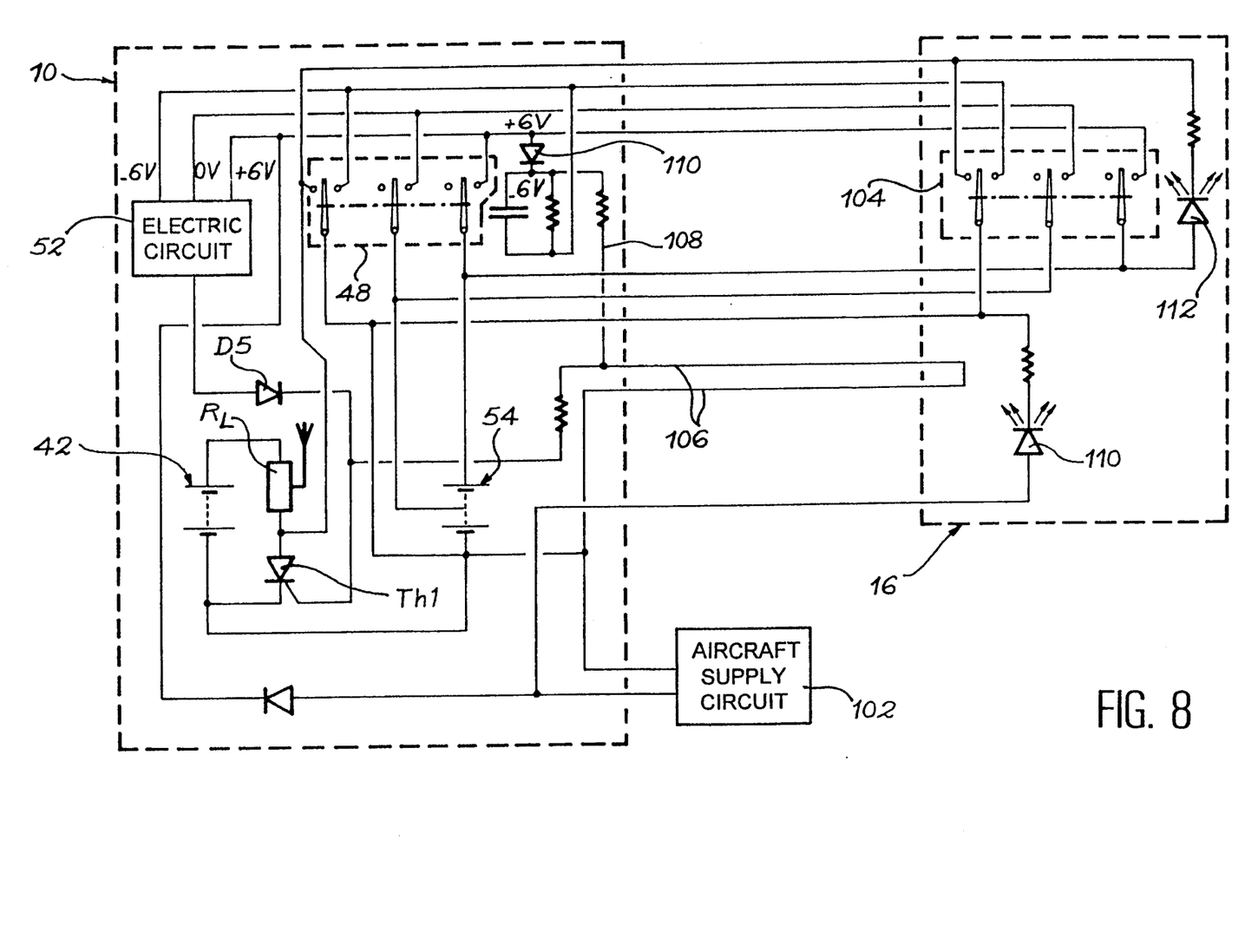
FIG. 8 A simplified electric diagram of the distress beacon, incorporating the remote control installed on the aircraft control panel.

FIG. 8 diagrammatically shows the different electrical connections between the elements contained in the beacon box 10, the remote control 16 and the aircraft supply circuit 102. As illustrated in FIG. 8, the remote control 16 has a three-position switch 104 connected in parallel on the switch 48 of the box 10, as well as two indicator lights 110, 112. The switches 48 and 104 are able to occupy a stop position, in which the electric circuits ore open (FIG. 8), an automatic position and a manual position. In the automatic position, the −6 V and +6 V and 0 terminals of the electronic circuit 52 are respectively connected to the opposite terminals of the two batteries 54 connected in series and to the center between said batteries. In the manual position, the thyristor Th1 is short-circuited, so that the emitter means are triggered, no matter what the shock detector state. The indicator light 112 is then energized by the batteries 54.

FIG. 8 also shows that the aircraft supply circuit 102 is connected in parallel on the batteries 54 and the assembly of the two switches 48 and 104, so that the batteries are automatically recharged. The indicator light 110 is then energized so as to inform the pilot of the recharging of the batteries.

FIG. 8 also shows that the electric circuit of the beacon has a loop 106 across which the control electrode of the thyristor Th1 is connected to the negative terminal of the group of batteries 54. This loop 106 travels in the aircraft, over most of the length thereof, in such a way that said loop automatically opens if the fuselage fractures, e.g. as a result of an explosion, which would not bring about the putting into operation of the emitter means without the action of the shock detector. A break in the loop 106 consequently has the effect of applying to the control electrode of the thyristor Th1 the 6 V reference voltage across a conductor 108 in which is located a diode 110.

I claim:

1. Shock detector which can be carried on a vehicle for automatically triggering, in the case of a shock or impact, at least one safety system, said detector comprising a shock transducer able to emit, in the case of a shock, a pulse signal having an amplitude and a duration respectively proportional to the amplitude and duration of the shock, integration means, sensitive to said pulse signal, for supplying an integrated signal having an amplitude which increases with the amplitude and duration of the shock and detection and control means sensitive to said integrated signal for triggering the safety system when the amplitude of said integrated signal exceeds a predetermined threshold;
said shock detector further comprising amplification means and shaping means for the pulse signal, interposed between the shock transducer and the integration means; and
wherein the pulse signal shaping means incorporate a non-linear amplifier and inverted clipping diodes having calibrated thresholds.

2. Shock detector according to claim 1 also comprising automatic zeroing means for the detection and control means following the reception by the latter of an integrated signal.

3. Shock detector according to claim 1, wherein the detection and control means incorporate means for regulating said predetermined threshold.

4. Shock detector according to claim 1, wherein the shock transducer is an electromagnetic transducer comprising a magnetic core able to slide in a tubular body in opposition to a calibrated spring when subject to a shock, as well as a detector coil positioned coaxially around the body.

5. Shock detector according to claim 4, wherein an intermediate, amagnetic material pellet is placed between the magnetic core and the spring.

6. Shock detector according to claim 4, wherein the ends of the tubular body are sealed and it has a calibrated orifice issuing at its end adjacent to the calibrated spring.

7. Shock detector according to claim 4, wherein a setscrew makes it possible to apply the magnetic core to the calibrated spring.

8. Shock detector according to claim 1, also incorporating an autonomous energy source.

9. Shock detector according to claim 8, wherein the autonomous energy source comprises at least one rechargeable battery, which can be connected to an electric supply circuit of the vehicle.

10. Shock detector according to claim 2, wherein the detection and control means incorporate means for regulating said predetermined threshold.

11. Aircraft distress beacon, incorporating a shock detector and emitter means controlled by said shock detector, wherein the shock detector comprises a shock transducer able to emit, in the case of a shock, a pulse signal having an amplitude and a duration respectively proportional to the amplitude and duration of said shock, integration means sensitive to said pulse signal for supplying an integrated signal having an amplitude, which increases with the amplitude and with the duration of the shock and detection and control means sensitive to said integrated signal for triggering the safety system when the amplitude of said integrated signal exceeds a predetermined threshold, wherein said shock detector further comprises amplification means and shading means for the pulse signal, interposed between the shock transducer and the integration means, and the pulse signal shaping means incorporate a non-linear amplifier and inverted clipping diodes having calibrated thresholds.

12. Distress beacon according to claim 11, wherein the shock detector forms an interchangeable part of the beacon.

13. Distress beacon according to claim 11, wherein the shock detector incorporates a first autonomous energy source and the emitter means incorporate a second autonomous energy source.

14. Distress beacon according to claim 11 comprising a control circuit for the emitter means, independent of the shock detector, able to control the automatic putting into operation of the emitter means in the case of a breakage of a cable of said control circuit forming a loop travelling within the aircraft.

15. Distress beacon according to claim 11 comprising a remote control, which can be placed on the aircraft control panel.

16. Shock detector which can be carried on a vehicle for automatically triggering, in the case of a shock or impact, at least one safety system, said detector comprising a shock transducer able to emit, in the case of a shock, a pulse signal having an amplitude and a duration respectively proportional to the amplitude and duration of the shock, integration means, sensitive to said pulse signal, for supplying an integrated signal having an amplitude which increases with the amplitude and duration of the shock and detection and control means sensitive to said integrated signal for triggering the safety system when the amplitude of said integrated signal exceeds a predetermined threshold;
said shock detector further comprising amplification means and shaping means for the pulse signal, interposed between the shock transducer and the integration means; and
wherein the pulse signal shaping means incorporate a non-linear amplifier and inverted clipping means having calibrated thresholds.

17. Aircraft distress beacon, incorporating a shock detector and emitter means controlled by said shock detector, wherein the shock detector comprises a shock transducer able to emit, in the case of a shock, a pulse signal having an amplitude and a duration respectively proportional to the amplitude and duration of said shock, integration means sensitive to said pulse signal for supplying an integrated signal having an amplitude, which increases with the amplitude and with the duration of the shock and detection and control means sensitive to said integrated signal for triggering the safety system when the amplitude of said integrated signal exceeds a predetermined threshold, wherein said shock detector further comprises amplification means and shaping means for the pulse signal, interposed between the shock transducer and the integration means, and the pulse signal shaping means incorporate a non-linear amplifier and inverted clipping means having calibrated thresholds.

* * * * *